(No Model.)
O. E. KENNEY & F. D. CABLE.
BICYCLE.
No. 485,583. Patented Nov. 1, 1892.
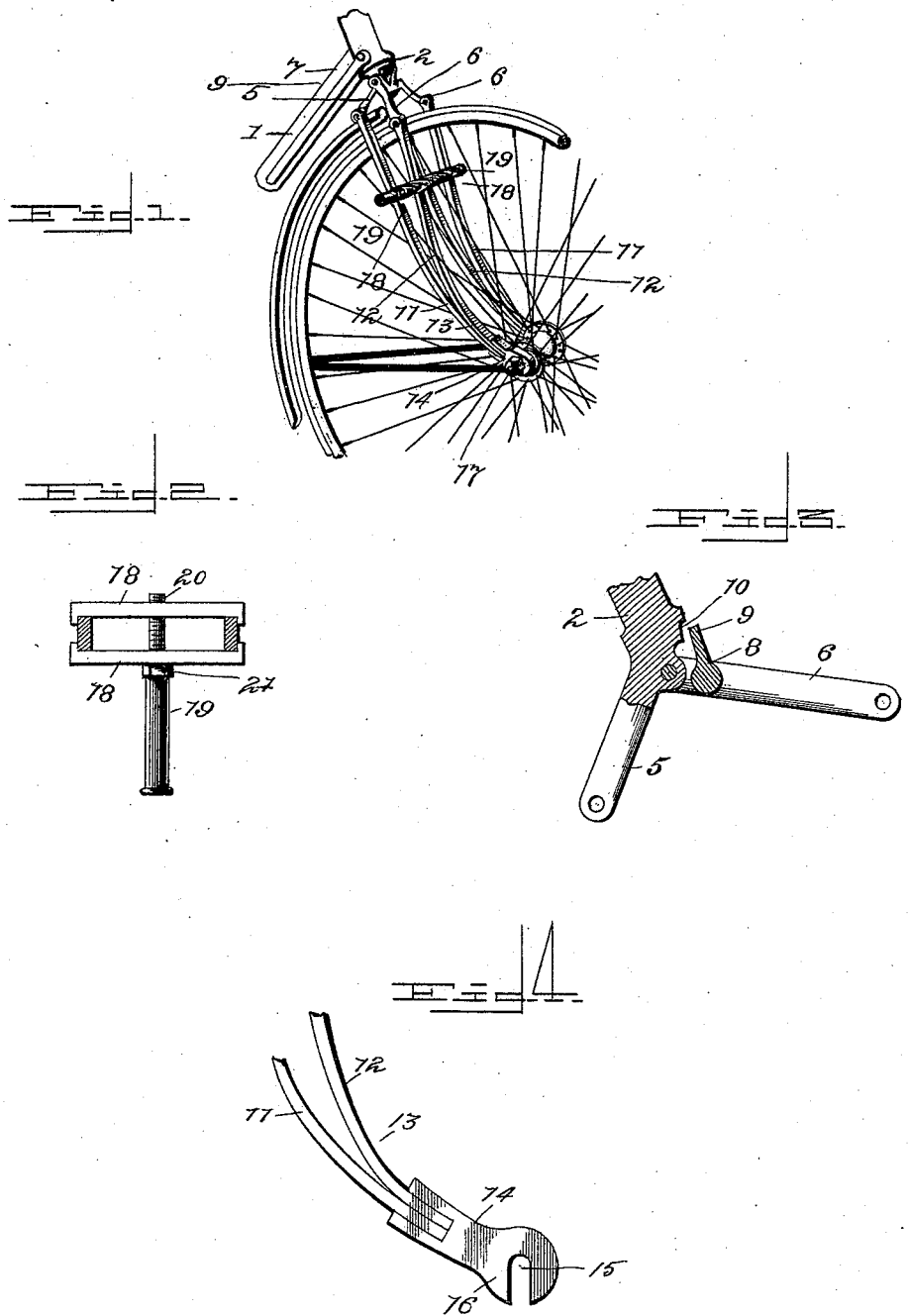
Witnesses
W. W. Pumphrey.
A. Aughinbaugh.
Inventors
O. E. Kenney & F. D. Cable
By their Attorney
W. E. Aughinbaugh

United States Patent Office.

OWEN E. KENNEY AND FRANK D. CABLE, OF TOLEDO, OHIO, ASSIGNORS TO THE TOLEDO BICYCLE COMPANY, OF SAME PLACE.

BICYCLE.

SPECIFICATION forming part of Letters Patent No. 485,583, dated November 1, 1892.

Application filed September 14, 1891. Serial No. 405,612. (No model.)

*To all whom it may concern:*

Be it known that we, OWEN E. KENNEY and FRANK D. CABLE, of Toledo, county of Lucas, and State of Ohio, have invented certain new and useful Improvements in Bicycles; and we do hereby declare that the following is a full, clear, and exact description of the invention, which will enable others skilled in the art to which it appertains to make and use the same, reference being had to the accompanying drawings, and to the numerals of reference marked thereon, which form part of this specification.

Our invention has relation to bicycles of the safety class and improvements thereon, which will be more fully described in the specification and specified in the claims.

In the accompanying drawings, Figure 1 is a perspective view of a spring-fork provided with our improvement; Fig. 2, a sectional view on the line x x of Fig. 1; Fig. 3, a sectional view of the steering-head of the machine, together with the top portions of the toggle-joint; and Fig. 4, a side elevation of the means for securing the lower portions of the spring-fork together.

1 represents an ordinary safety-bicycle frame.

2 is the steering-head. To the lower portion of the steering-head is connected a spring-fork composed of toggle-arms 5 5 and 6 6, the latter being pivoted at 7 to the steering-head. The toggle-arms 6 are suitably connected together, as by a bar, at 8, from which bar extends upwardly a projection 9, adapted to contact with a projection, as 10, on the lower portion of the steering-head. Pivotally connected to the arms 5 5 and 6 6 are spring-bars 11 11 and 12 12, one bar of each set extending downwardly upon opposite sides of the front wheel of the bicycle. The lower ends of the spring-bars 11 11 and 12 12 are preferably curved, as at 13, and each set is secured in a foot-piece 14, adapted to rest upon the axle at opposite sides of the wheel. The lower ends of each set of spring-bars are preferably brazed in a socket 15 in the foot-pieces. Each foot-piece is provided with a yoke 16, adapted to fit over the axle upon which it is secured by any suitable means, as by a nut 17. Upon each set of spring-bars, at the opposite sides of the wheel, we attach a combined foot-rest and tension device consisting of two clamp-pieces 18 18, having projections at their ends adapted to embrace the said bars.

19 is a bar composing the foot-rest proper, one end 20 of which bar is threaded and adapted to pass through holes correspondingly threaded in the clamp-pieces 18 18. A nut 21, at one end of said threaded portion, serves to adjust the clamp-pieces upon the spring-bars.

It is obvious that the positions of our combined foot-rest and tension device may be readily varied by loosening the nut and sliding the clamping-pieces up and down on the spring-bars.

The purpose of the projection 9 on the arm 6 and of the stop 10 on the steering-head 2 is to prevent strain of the machine by too great upward throw of the toggle-bars when an unusual obstruction—such as a depression in the road or a large stone—is met with. It will be evident that upon such occasions the stops 9 will be thrown into contact with the projection 10, and thus jar and breakage of the machine be obviated.

What we claim is—

1. In a bicycle, the steering-head, toggle-arms upon which said steering-head rests, spring-bars connected to said toggles, and a tension device spanning said spring-bars, and a combined tension device and foot-rest adjustably secured upon said bars.

2. The combination, in a bicycle, of a steering-head provided with a projection, toggle-arms upon which said head rests, spring-bars connected to said toggle-arms, and a stop on one of the toggles, adapted to engage said projections.

3. In a bicycle, the combination of a steering-head, toggles upon which said steering-head rests, spring-arms connected to said toggles, foot-pieces adapted to engage the wheel-axle, and each provided with a socket, the ends of the spring-bars being secured in the foot-pieces by brazing.

4. In a bicycle, a steering-head provided with a projection, toggles upon which said head rests, spring-arms connected to said toggles, a stop adapted to contact with the projections on the steering-head, and a combined foot-rest and tension device clamping the spring-arms together.

5. A combined tension device and foot-rest consisting of clamping-pieces adapted to embrace the fork-arms, and a bar having a threaded end adapted to pass through said clamping-pieces, and a nut on said threaded end.

6. In a bicycle, a steering-head, a spring-fork upon which said steering-head is mounted, said fork comprising toggles, and spring-bars below the toggles, clamps embracing the fork on each side of the wheel, a foot-rest passing through the clamps and provided with means for securing the clamping-sections together, said clamp-pieces having projections at their ends adapted to embrace the spring-bars.

In testimony that we claim the foregoing as our own we hereby affix our signatures in presence of two witnesses.

OWEN E. KENNEY.
FRANK D. CABLE.

Witnesses:
WILLIAM WEBSTER,
Q. B. TAYLOR.